US009403113B2

(12) United States Patent  
Kawabe et al.

(10) Patent No.: US 9,403,113 B2  
(45) Date of Patent: Aug. 2, 2016

(54) AIR FILTER ASSEMBLY

(71) Applicant: DONALDSON COMPANY, INC., Minneapolis, MN (US)

(72) Inventors: Yota Kawabe, Tachikawa (JP); Kenji Ito, Tachikawa (JP); William Vanaudenhove, Diest (BE)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 14/265,717

(22) Filed: Apr. 30, 2014

(65) Prior Publication Data

US 2014/0230387 A1   Aug. 21, 2014

Related U.S. Application Data

(63) Continuation of application No. PCT/US2012/061342, filed on Oct. 22, 2012.

(60) Provisional application No. 61/553,407, filed on Oct. 31, 2011, provisional application No. 61/636,187, filed on Apr. 20, 2012, provisional application No. 61/707,164, filed on Sep. 28, 2012.

(51) Int. Cl.
*B01D 46/24*  (2006.01)
*B01D 46/00*  (2006.01)
(Continued)

(52) U.S. Cl.
CPC ........ *B01D 46/2414* (2013.01); *B01D 46/0024* (2013.01); *B01D 46/0049* (2013.01); *B01D 46/2411* (2013.01); *B01D 46/4272* (2013.01);
(Continued)

(58) Field of Classification Search
CPC ........... B01D 46/0024; B01D 46/0026; B01D 46/2411; B01D 46/2414; B01D 2271/027; B01D 46/0049
See application file for complete search history.

(56) References Cited

U.S. PATENT DOCUMENTS

| 4,455,877 A | 6/1984 | Blechinger et al. |
| 4,742,711 A | 5/1988 | Porth et al. |
| 5,059,221 A | 10/1991 | McWilliam |

(Continued)

FOREIGN PATENT DOCUMENTS

| EP | 1 090 217 B1 | 3/2003 |
| EP | 1 843 035 | 10/2007 |

(Continued)

OTHER PUBLICATIONS

International Search Report for International Application No. PCT/US2012/061342 mailed Jun. 18, 2013 (6 pages).

*Primary Examiner* — Robert Clemente
(74) *Attorney, Agent, or Firm* — Merchant & Gould PC

(57) ABSTRACT

An air filter assembly having a primary filter element, a secondary filter element, and a housing with an outlet tube is disclosed. The primary filter element is operably installed within the housing and has an interior volume. The secondary filter element is operably installed within the primary filter element interior volume and has an interior volume defined by a first wall extending between a closed end cap and an opposite open end cap. The open end cap of the secondary filter element defines a sealing structure having a first portion extending into the secondary filter interior volume. The outlet tube is operably connected to the housing air outlet opening and includes an inset collar being at least partially disposed within the secondary filter interior volume and extending over at least a part of the sealing structure first portion.

19 Claims, 16 Drawing Sheets

(51) Int. Cl.
  *B01D 46/42* (2006.01)
  *B01D 46/44* (2006.01)
(52) U.S. Cl.
  CPC .......... *B01D 46/44* (2013.01); *B01D 2271/027* (2013.01)

(56) References Cited

U.S. PATENT DOCUMENTS

| | | | |
|---|---|---|---|
| 5,120,334 | A | 6/1992 | Cooper |
| 6,167,862 | B1 | 1/2001 | Powell et al. |
| 6,178,939 | B1 | 1/2001 | Powell |
| 6,267,006 | B1 | 7/2001 | Bugli et al. |
| 6,645,274 | B2 | 11/2003 | Rilling et al. |
| 7,140,344 | B2 | 11/2006 | Imanishi et al. |
| 7,905,153 | B2 | 3/2011 | Jasnie |
| 8,241,413 | B2 | 8/2012 | Dirnberger |
| 2006/0254229 | A1* | 11/2006 | Schrage et al. ............ 55/498 |
| 2008/0190082 | A1* | 8/2008 | Scott et al. ............ 55/520 |
| 2010/0037570 | A1* | 2/2010 | Osendorf et al. ............ 55/355 |
| 2010/0146920 | A1 | 6/2010 | Iddings et al. |
| 2011/0219768 | A1 | 9/2011 | Namimatsu et al. |

FOREIGN PATENT DOCUMENTS

| | | |
|---|---|---|
| JP | 2012-202364 A | 10/2012 |
| JP | 2012-207539 A | 10/2012 |
| JP | 2012-207540 A | 10/2012 |

* cited by examiner

AIR FILTER ASSEMBLY

This application is being filed on 30 Apr. 2014, as a US Continuation Application of PCT International patent application No. PCT/US2012/061342, filed 22 Oct. 2012 and claims priority to U.S. Provisional Application Ser. No. 61/553,407, filed on Oct. 31, 2011, 61/636,187, filed Apr. 20, 2012, 61/707,164, filed Sep. 28, 2012, and which applications are incorporated herein by reference. To the extent appropriate, a claim of priority is made to each of the above disclosed applications.

TECHNICAL FIELD

This disclosure relates to air filter assemblies suitable for use in engine air intake systems.

BACKGROUND

Air streams can carry contaminant material therein. In many instances, it is desired to filter some or all of the contaminant material from the air stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the air. A variety of air filter arrangements have been developed for contaminant rejection. In many instances, especially where government regulations require, it is also desired to measure the mass flow rate of the filtered air that will be delivered. In some applications, it is desirable to include an air metering device within the air filter arrangement. However, other components within the filter arrangement often cause excessive turbulence thereby minimizing the accuracy of the measured airflow for such a configuration. Improvements are sought.

SUMMARY

An air filter assembly having a primary filter element, a secondary filter element, and a housing with an outlet tube is disclosed. The housing has an interior volume defined by a sidewall extending between a first end and a second end. The housing also has an air inlet opening in the sidewall and an air outlet opening in the first end. The primary filter element is operably installed within the housing and has an interior volume defined by a first wall extending between a closed end cap and an opposite open end cap. The secondary filter element is operably installed within the primary filter element interior volume and has an interior volume defined by a first wall extending between a closed end cap and an opposite open end cap. The open end cap of the secondary filter element defines a sealing structure having a first portion extending into the secondary filter interior volume. The outlet tube is operably connected to the housing air outlet opening and includes an inset collar being at least partially disposed within the secondary filter interior volume and extending over at least a part of the sealing structure first portion.

A safety filter element is also disclosed comprising a first wall of media extending between a closed end cap and an opposite open end cap wherein the first wall and end caps define an interior volume. The end cap defines a sealing structure having a first portion extending into the interior volume. An inset collar is secured to the first portion of the sealing structure and is at least partially disposed within the interior volume.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
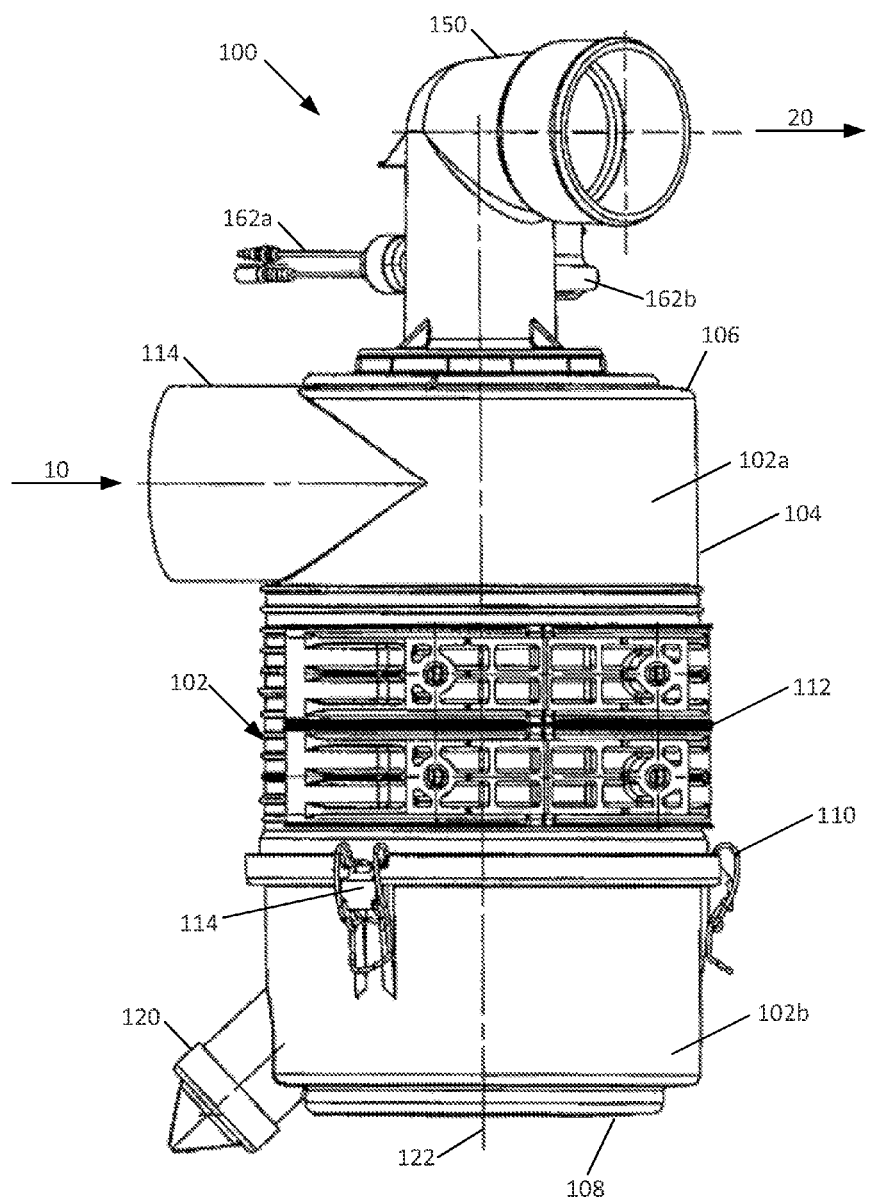
FIG. 1 is a front view of a filter assembly.
Figure 2:
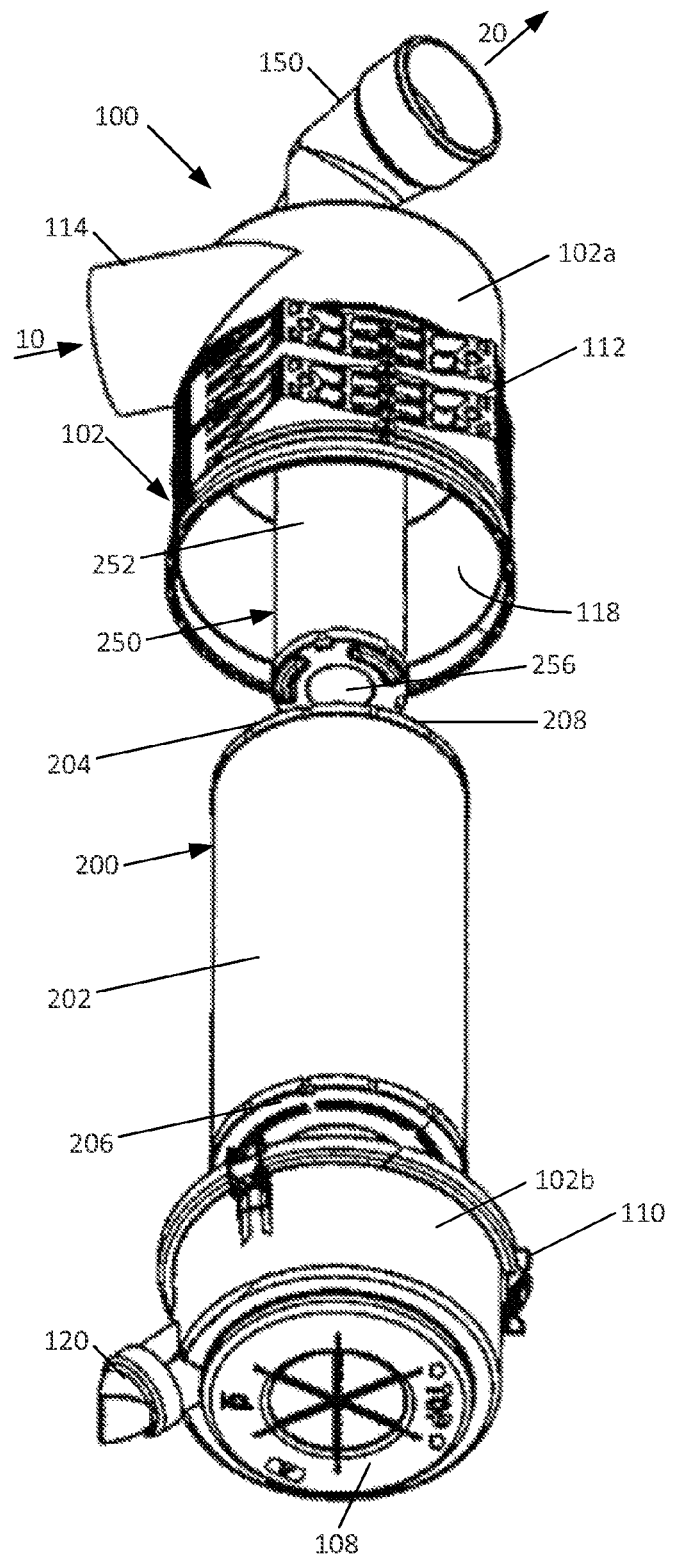
FIG. 2 is a perspective exploded view of the filter assembly shown in FIG. 1.
Figure 3:
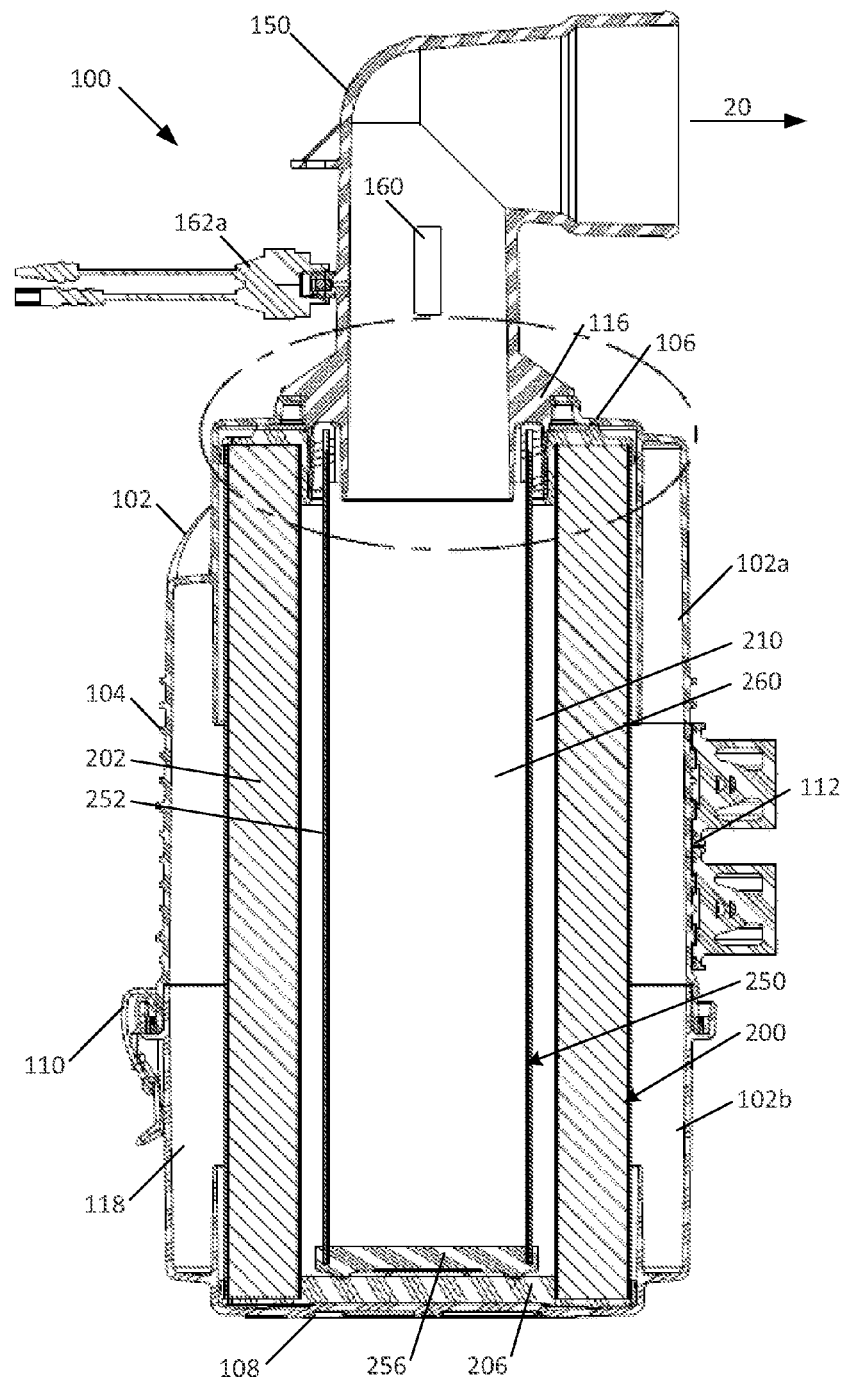
FIG. 3 is a cross-sectional view of the filter assembly shown in FIG. 1.

With reference to FIGS. 1-3, an air filter assembly 100 is shown. For the purposes of the description in this application, air filters are discussed, but the various embodiments described herein also relate to filtration of other gases. Air filter assembly 100 is for filtering a dirty air stream 10 to provide a clean airflow stream 20 to an end use device, for example an internal combustion engine. The primary components of the air filter assembly 100 are a housing 102 having an inlet 114 and an outlet tube 150, a primary filter element 200, and a secondary filter element 250. Each of these aspects of the disclosure is discussed in further detail in the following paragraphs.

As can be seen in FIGS. 1 and 2 air filter assembly 100 is shown as further including an optional dust ejection valve 120. Dust ejection valve 120 is for discharging accumulated debris within the housing 102 via a cyclone effect occurring inside the housing. In the embodiment shown, dust ejection valve 120 is a duckbill valve. One skilled in the art will appreciate that other types of valves known in the art may also be used.

With reference to FIGS. 1 and 3, air filter assembly 100 also includes an optional metering devices 162a, 162b. Metering devices 162a, 162b can be for measuring an aspect of the clean airflow stream 20. One example of an aspect of the clean airflow stream 20 is the velocity of the air. The metering devices 162a, 162b may also measure air pressure. Another example is the oxygen content of the airflow stream 20. Yet another example of an aspect of the clean airflow stream 20 is the temperature. In the particular embodiment shown, metering device 162b is a hot wire anemometer configured to output a pulse width modulation signal proportional to the mass air flow rate of the airflow stream 20. Other types of metering devices are suitable for this type of measurement, such as vane meter sensors and vortex shedding sensors. One skilled in the art will appreciate that other types of metering devices known in the art may also be used.

As stated above, air filter assembly 100 includes a primary filter element 200 which can be best seen in FIGS. 2 and 3. Primary filter element 200 is exposed to the dirty airflow stream 10 and filters the air to create clean airflow stream 20. As shown, primary filter element includes a first wall of filter media 202 formed into the shape of a tube that extends between an open end cap 204 and an opposite closed end cap 206. In the particular embodiment shown, the end caps 204, 206 are molded from a resilient urethane material. The resulting media and end cap structure defines an interior volume 210. In operation, the dirty airflow stream 10 is exposed to the exterior of the first wall of filter media 202 which passes through the first wall of filter media 202 into the interior volume 210.

It is noted that the primary filter can be provided with or without an outer liner, and can be provided with or without an inner liner. Typically, the primary filter element 200 will comprise pleated media and no inner liner and no outer liner. The media will typically be pleated and may include corrugations extending generally perpendicularly to the pleat tips, to facilitate keeping the pleats open during use. Various pleat tip folding techniques can be used to facilitate this, as are common in the art. Examples of this can be found in media packs having the mark "Pleatloc" from Donaldson Company, Inc., of Minneapolis, Minn., the Assignee of the present disclosure.

Figure 6:
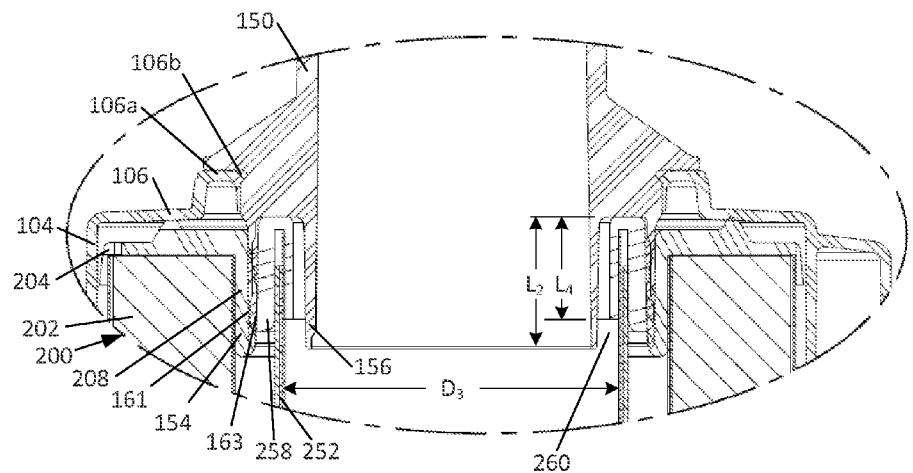
FIG. 6 is an enlarged cross-sectional view of a portion of the filter assembly shown in FIG. 2.

As can be most easily seen at FIGS. 2 and 6, the open end cap 204 defines a sealing structure 208 that encases an end of the first wall of filter media 202. Sealing structure 208 is for providing a radial seal between the exterior of the primary filter element 200 and the interior volume 210 such that the dirty airflow stream 10 cannot bypass the filter media 202 and mix with clean airflow stream 20. In the embodiment shown, sealing structure 208 forms a radial seal with the outlet tube 150. Sealing structure 208 may be made from a variety of materials, such as polyurethane and rubber.

Installed within the interior volume 210 of the primary filter element 200 is the secondary filter element 250. Secondary filter element 250 is for providing a safety function in the event of a failure or removal of primary filter element 200. In this regard, secondary filter element 250 prevents direct exposure of the intake air path to the internal combustion engine to the environment when the primary filter element 200 is either damaged or removed.

In the embodiment shown, secondary filter element 250 includes a first wall of media 252 formed into the shape of a tube that extends between an open end cap 254 and an opposite closed end cap 256. In the particular embodiment shown, the end caps 254, 266 are molded from a resilient urethane material. This structure defines an interior volume 260 which is in uninterrupted and direct fluid communication with the outlet tube 150 of the air filter assembly. As shown, the interior volume has an internal diameter $D_3$. The first wall of media 252 can be made from synthetic or natural materials and can be pleated or non-pleated. For example, media 252 can include pleated cellulose, pleated or flat cellulose/synthetic and spun bond materials treated with special additives. Media wall 252 can also have a single layer or multiple layers of media. The secondary filter element 250 can also be formed with an inner and/or an outer liner for increased structural strength. In the exemplary embodiment shown, media wall 252 comprises two layers of filter media and a liner.

Figure 4:
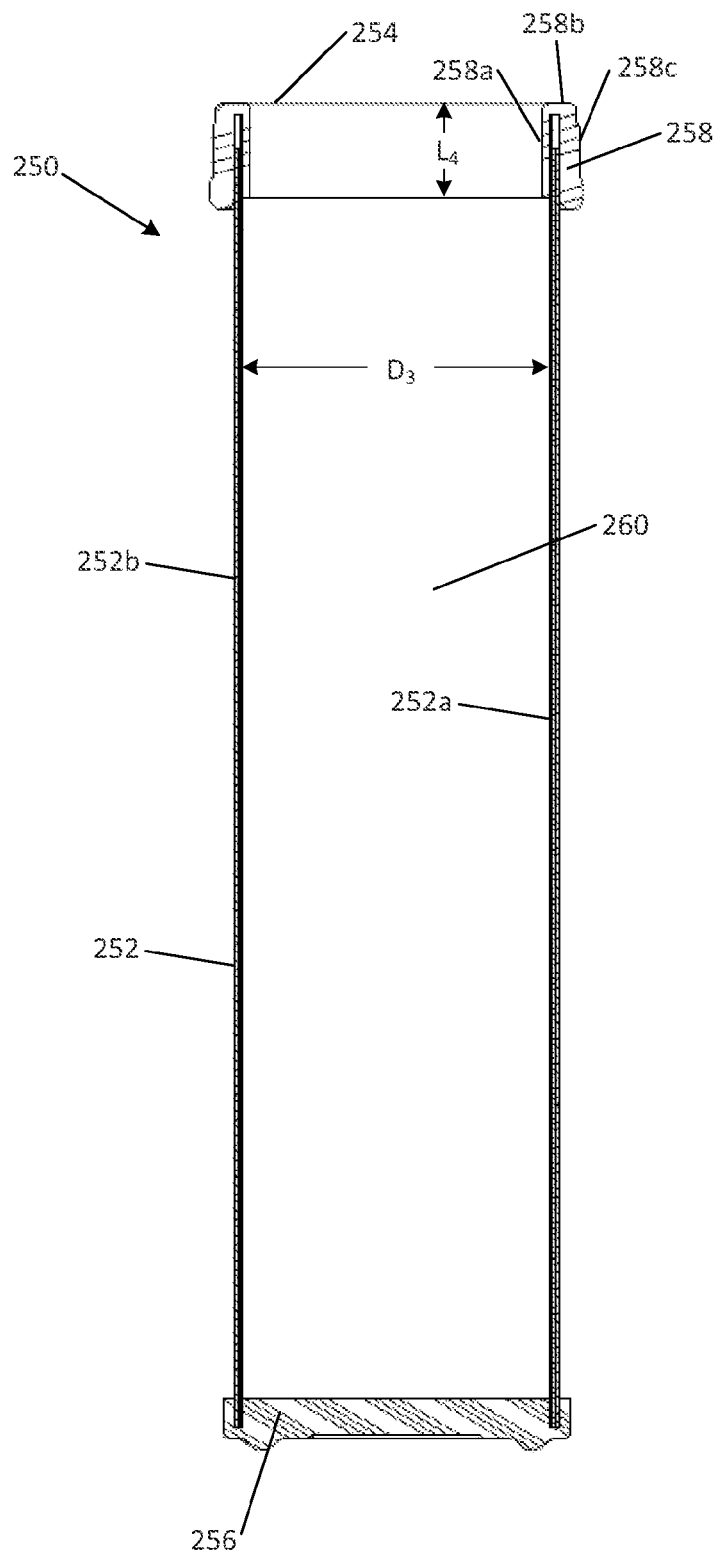
FIG. 4 is a cross-sectional view of a secondary filter suitable for use in the filter assembly shown in FIG. 1.

As can be most easily seen at FIG. 4, the open end cap 254 of secondary filter 250 defines a sealing structure 258 that encases an end of the first wall of filter media 252. Sealing structure 258 is for providing a seal between the exterior of the secondary filter element 250 and the interior volume 260 such that air cannot bypass the filter media 252 into outlet tube 150. Sealing structure 258 includes a first portion 258a that extends into interior volume 260 along an interior side 252a of the first wall of filter media 252. In the embodiment shown, first portion 258 has a length $L_4$ that is about 25 mm. Sealing structure 258 also includes a second portion 258b and a third portion 258c that extend over the end portion and an exterior side 252b of the first wall of filter media 252, respectively. Third portion 258c is configured to form a radial seal against the outlet tube 150.

As mentioned previously, air filter assembly 100 includes a housing 102, as can be seen most easily in FIGS. 1-3. As shown, housing 102 has a sidewall 104 extending between a first end 106 and a second end 108 that together define an internal volume 118. It is within internal volume 118 that the primary filter element 200 and the secondary filter element 250 are installed, their closed ends being nearest the second end 108 of the housing 102. To facilitate the installation and removal of the filters 200, 250, the housing 102 is constructed to have a first shell 102a and a separable second shell 102b that allow for access into the interior volume 118. The first and second shells are held together by fastening means 110. In the particular embodiment shown, the fastening means 110 is a plurality of clasps 110. The filter assembly housing 102 is also provided with mounting band 112 for mounting the filter assembly 100 to a structure, such as a motorized vehicle.

Figure 5:
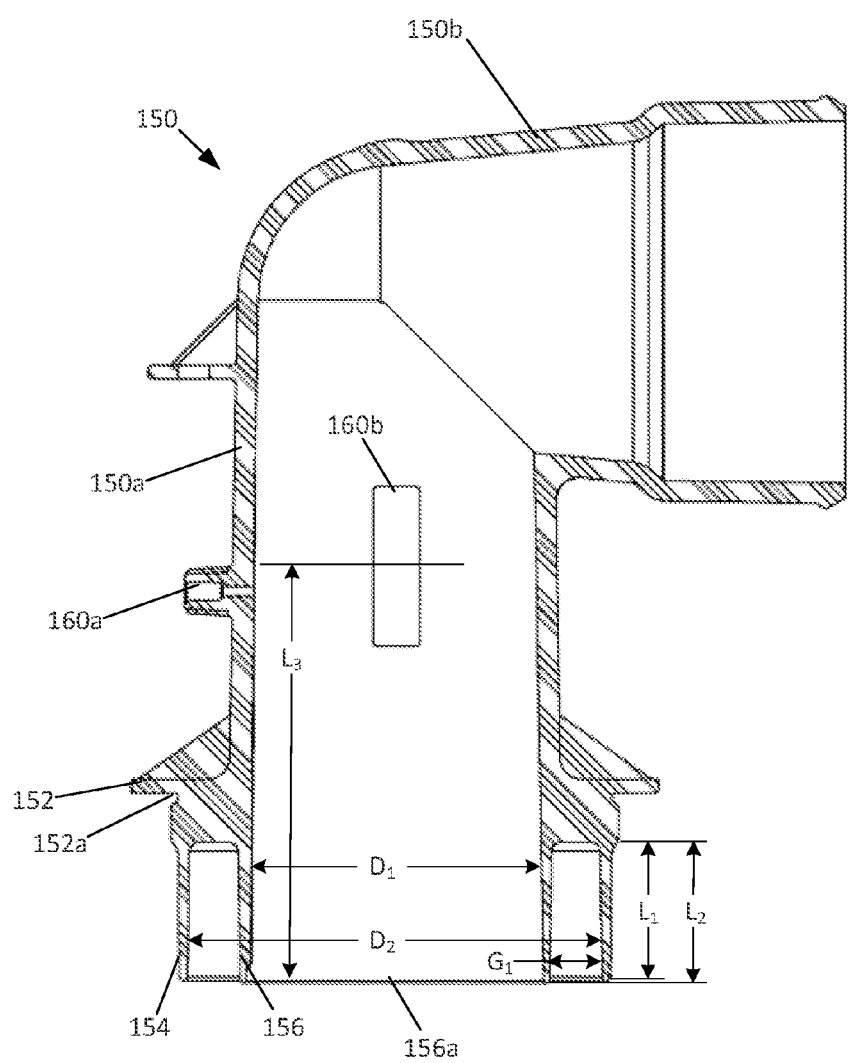
FIG. 5 is a cross-sectional view of an outlet tube suitable for use in the filter assembly shown in FIG. 1.

The housing 102 further includes an air inlet opening 114 within the sidewall 104 for allowing entry of the dirty airflow stream 10. Housing 102 also has an outlet opening 116 defined by the first end 106 to allow the clean air stream 20 to exit the interior volume 118 of the housing. The first end 106 of the housing also defines a shoulder surface 106a and an outward projection 106b for supporting and retaining the outlet tube 150 through which the clean airflow stream 20 is delivered. With reference to FIG. 5, the outlet tube 150 includes a shoulder 152 and a recess 152a which correspondingly engage shoulder surface 106a and outward projection 106$b$, respectively. This structure allows for outlet tube 150 to be supported and rotatable with respect to housing 102.

Still referencing FIG. 5, the outlet tube 150 has a first section 150$a$ configured for connection to the housing first end 106 and a second section 150$b$ configured for connection to an outlet hose (not shown). As shown, the first and second sections 150$a$, 150$b$ are at about right angles to each other and form an elbow. Alternatively, the first and second sections 150$a$, 150$b$ can be at other angles to each other, including being in line with each other to form a straight outlet tube 150. In the embodiment shown, the first section 150$a$ and the housing 102 share a common longitudinal axis 122, as illustrated in FIG. 1.

As shown in the drawings, the first section 150$a$ of outlet tube 150 has a generally constant internal diameter, $D_1$. As used throughout this disclosure, the term "generally constant diameter" is taken to mean that the sidewall does not vary from the longitudinal axis by more than about 5 degrees. Due to manufacturing limitations for some materials, especially with plastic molding requiring at least some draft angle, it is sometimes not possible to obtain a perfectly parallel internal wall. As such, the sidewall may form a generally constant diameter, but have a slight taper. In the embodiment shown, outlet tube 150 is made from plastic and has a draft angle taper of approximately 1 degree such that the first section 150$a$ narrows slightly as it extends in a downstream direction towards the second section 150$b$.

In the embodiment shown, the first section 150$a$ of outlet tube 150 includes an outer collar 154. With reference to FIG. 6, outer collar 154 provides a first radial seal 161 against the seal structure 208 of the primary filter element 200 and a second radial seal 163 against the third portion 252$c$ of the sealing structure 252 of the secondary filter element 250. As constructed, outer collar 154 operates to ensure that unfiltered air from the air flow inlet 114 cannot bypass the primary and secondary filter elements 200, 250 to the outlet tube 150. In the embodiment shown, outer collar 154 has a length $L_1$ of about 30 millimeters (mm) and an average internal diameter $D_1$ of about 90 mm.

The first section of outlet tube 150 is also shown as including an inset collar 156. Inset collar 156 is for minimizing the airflow flow dispersion and maximizing the flow stability of the clean airflow stream 20 flowing from the secondary filter element internal volume 260 as it is introduced into outlet tube 150. In certain configurations, a typical end cap on the secondary filter element can cause significant disruption to the airflow which in turn adversely affects the readings one might obtain from a metering device 162$b$.

In certain embodiments, the inset collar 156 extends at least partially into the interior volume 260 of the secondary filter element 250. As shown most clearly in FIG. 6, inset collar 156 extends into the interior volume 260 of the secondary filter element and over the first portion 258$a$ of the sealing structure 258. Such a configuration allows for air flowing within interior volume 260 to be directed into the first section 150$a$ of the outlet tube 150 without passing over the first portion 258$a$ of the sealing structure 258 of the open end cap 250. One benefit of this arrangement is that irregularities in the dimensions of the sealing structure 258 can be shielded from air flow and thus prevented from disrupting the air flow.

In the particular embodiment shown, the inset collar 156 has a length $L_2$ of about 31 mm and an average internal diameter $D_2$ of about 65 mm such that the resulting gap $G_1$ between the inset collar 156 and the outer collar 154 is about 13 mm. In some embodiments, length $L_2$ is greater than the gap $G_1$. In other embodiments, length $L_2$ is at least two times greater than the gap $G_1$. As shown in FIG. 6, the gap $G_1$ allows for inset collar 156 to be separated from the first portion 258$a$ such that a seal is not formed between inset collar 156 and sealing structure 258. The inset collar 156 also extends over the first portion 258$a$ of the seal structure 258 by an amount equal to the difference between the length of the inset collar $L_2$ and the length of the first portion $L_4$.

In certain embodiments, length $L_2$ is substantially greater than length $L_4$. In other embodiments, length $L_2$ allows inset collar 156 to at least partially cover the seal structure first portion 258$a$ of the secondary element 250. In other embodiments, length $L_2$ is long enough for inset collar 156 to at cover a majority of the seal structure first portion 258$a$ along length $L_4$. In still other embodiments, length $L_2$ is equal to or greater than the length $L_4$ of the seal structure first portion 258$a$ such that the first portion 258$a$ is fully covered. In certain embodiments, length $L_2$ is at least one quarter of the inner diameter $D_3$ of the secondary filter element 250. In other embodiments, length $L_2$ is at least one third the inner diameter $D_3$ of the secondary filter element 250.

The first section of outlet tube 150 also includes a sensor port 160$a$, 160$b$ to accommodate the installation of the airflow metering device 162$a$, 162$b$ or other sensing device. In the embodiment shown, port 160$b$ is a distance $L_3$ above the end 156$a$ of the inset collar 156. Along this length, the first portion 150$a$ of the outlet tube 150 has a smooth surface which allows for the clean airflow 20 to have an enhanced velocity profile leading up to metering device 162. This configuration also results in a ratio of $L_3$ to $D_1$ of about 2.3 to 1 to 2.5 to 1. It is desirable for this ratio to be at least 1 to 1, and more preferable for this ratio to be at least 2 to 1. It is also desirable for the ratio of $L_3$ to the actual diameter of the inlet tube at the sensor port 160$b$ (slightly less than $D_1$ due to the draft angle) to be at least 1.1 to 1. In certain embodiments, length $L_2$ provides at least 20% of the total length $L_3$ from the upstream end of the inset collar 156 to the flow metering device. As noted above, the second section 150$b$ of outlet tube 150 is shown as being at about a right angle to the first section 150$a$. Because of this configuration, the location of where the metering device 162$b$ can be mounted is constrained and limits length $L_3$ to a location where the airflow is still traveling in a uniform direction before the elbow.

Figure 20:
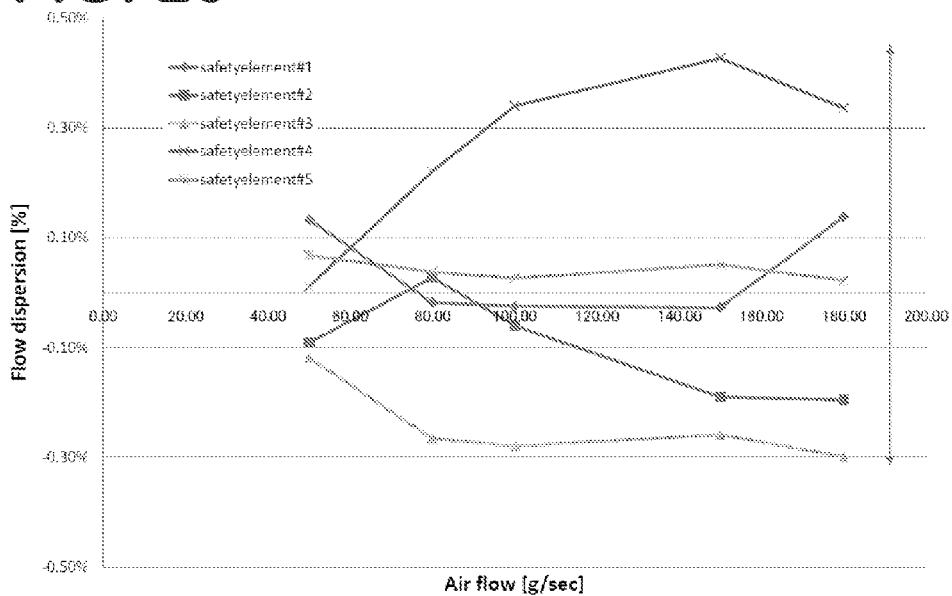
FIG. 20 is a schematic chart showing test results for an air filter assembly without the inset collar of the filter assembly shown in FIG. 1.
Figure 21:
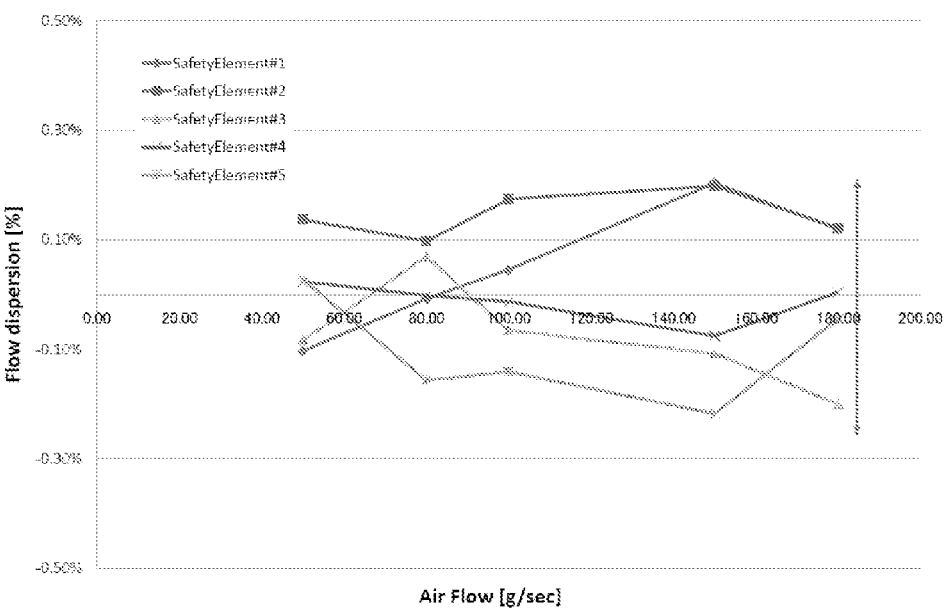
FIG. 21 is a schematic chart showing test results for an air filter assembly with an inset collar.
Figure 22:
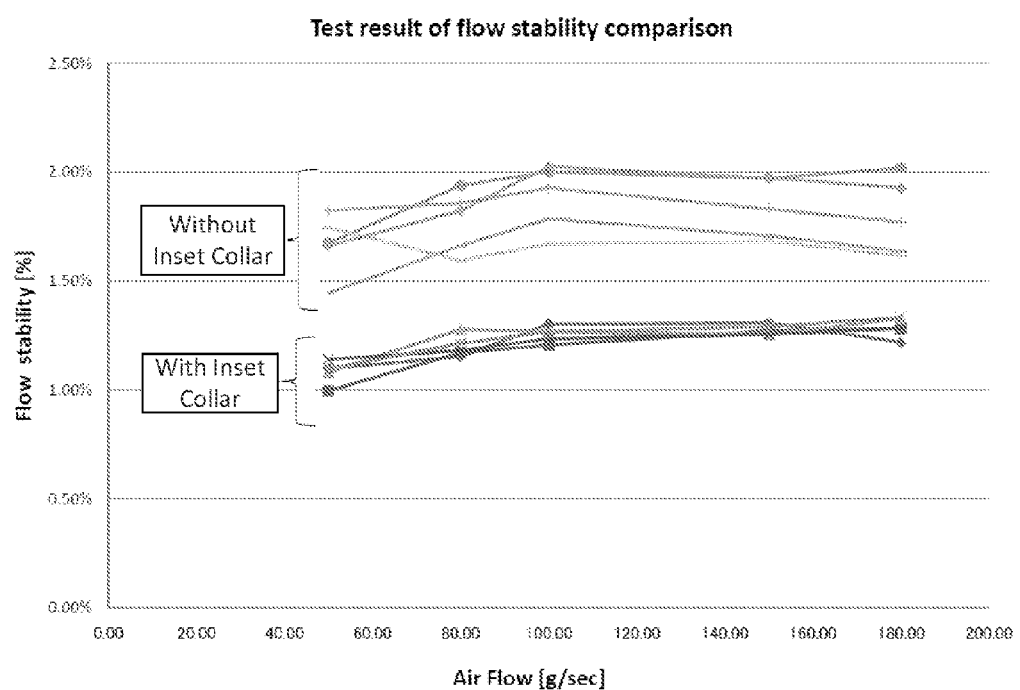
FIG. 22 is a schematic comparison chart showing test results for an air filter assembly with and without an inset collar.

By utilizing an inset collar 156 in an air filter assembly 100, as described above and shown in the drawings, a significantly improved airflow profile at the location of sensor port 160$b$ can be achieved, as evidenced by the test result charts provided in FIGS. 20-22. FIG. 20 shows a schematic chart showing multiple test results for an air filter assembly that is not provided with an inset collar, and thus allows for airflow to pass over the open end cap of the safety filter element prior to entering the outlet tube. As can be seen, the flow dispersion percentage for such a configuration ranges from about +0.45% to about −0.3%. In comparison, FIG. 21 represents test results for the same filter elements, but with the inset collar 156 installed, and shows that the flow dispersion percentage range is reduced to a range from about +0.2% to about −0.2%. FIG. 22 shows similar comparative results for improvements in flow stability percentage with the inset collar 156 present.

Referring to FIGS. 7-19, additional embodiments are presented. As many of the concepts and features are similar to the first embodiment shown in FIGS. 1-6, the description for the first embodiment is hereby incorporated by reference for all other embodiments, and vice versa. Where like or similar features or elements are shown, the same reference numbers will be used where possible. The following descriptions for the additional embodiments will be limited primarily to the differences between the embodiments.

Figure 7:
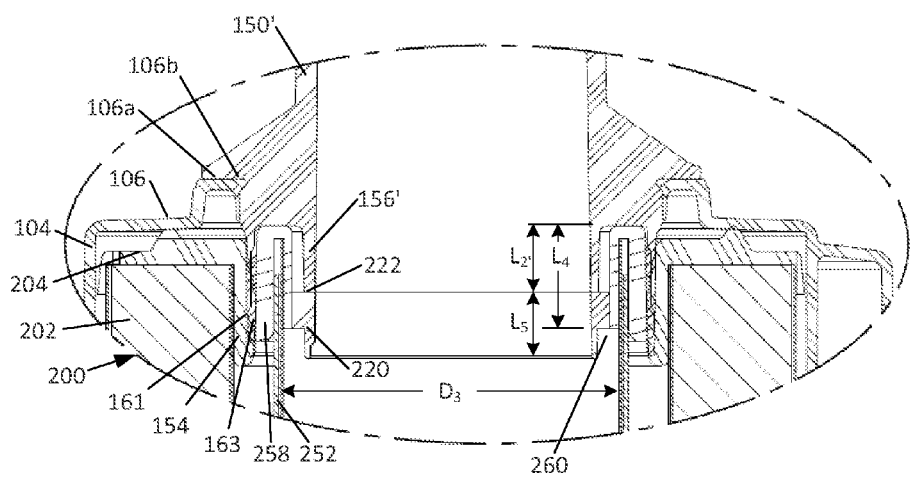
FIG. 7 is an enlarged cross-sectional view of a second embodiment of a filter assembly.

Referring to FIG. 7, an alternative embodiment of an outlet tube and inset collar is shown. As can be seen, inset collar 156' is provided at a shorter length $L_2'$ and does not extend the full length of the first portion 258a of the secondary filter element seal structure 258. Also, inset collar 156' is attached to the seal structure 258 of the secondary filter element 250. An additional inset collar 220 having a length $L_5$ is provided attached to the first seal structure portion 258a. Insert collar 220 is configured to mate with the end of the inset collar 156' at an interface location 222 to form an assembled inset collar. The inset collars 156' and 220 can be configured to have teeth, splines or other positive registration means to ensure that they have mated together properly at interface location 222.

Figure 8:
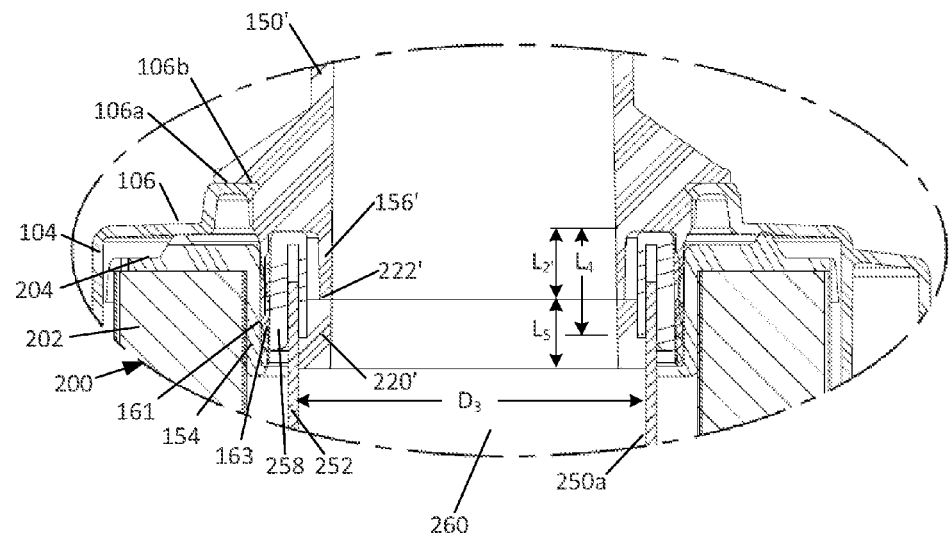
FIG. 8 is an enlarged cross-sectional view of a third embodiment of a filter assembly.

Referring to FIG. 8, another alternative embodiment of an outlet tube and inset collar is shown. Similarly to the embodiment shown in FIG. 7, inset collar 156' is provided at a shorter length $L_2'$ and does not extend the full length of the first portion 258a of the secondary filter element seal structure 258. An additional inset collar 220' having a length $L_5$ is provided and configured to mate with the end of the inset collar 156' at an interface location 222' to form an assembled inset collar. The inset collars 156' and 220' can be configured to have teeth, splines or other positive registration means to ensure that they have mated together properly at interface location 222'. In contrast to the embodiment shown in FIG. 7, the inset collar 220' is attached directly to the secondary filter element 250 in FIG. 8. In one embodiment, the inset collar 156' is attached to an interior liner 250a of filter element 250. The interior liner 250a of filter element 250 and inset collar 220' can be formed from the same or different materials and can be plastic, metal, or other types of materials. In a preferred embodiment, interior liner 250a and inset collar 220' are both plastic.

Figure 9:
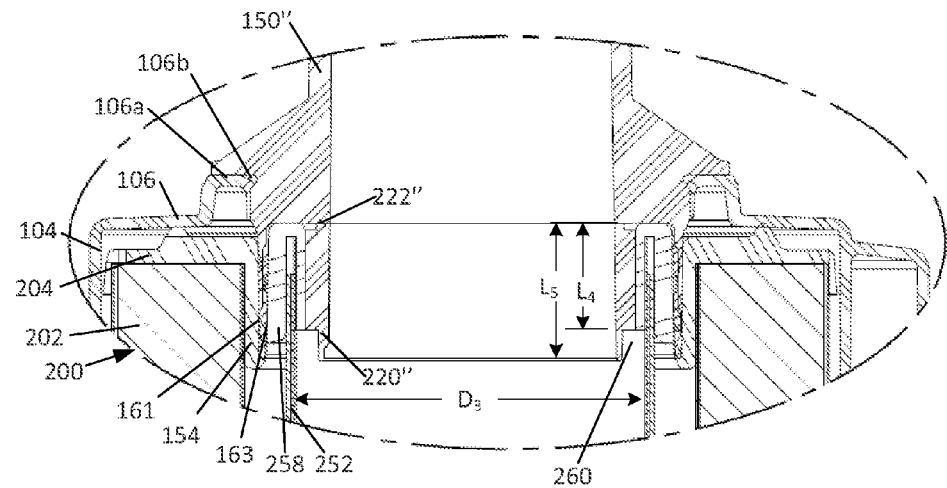
FIG. 9 is an enlarged cross-sectional view of a fourth embodiment of a filter assembly.
Figure 10:
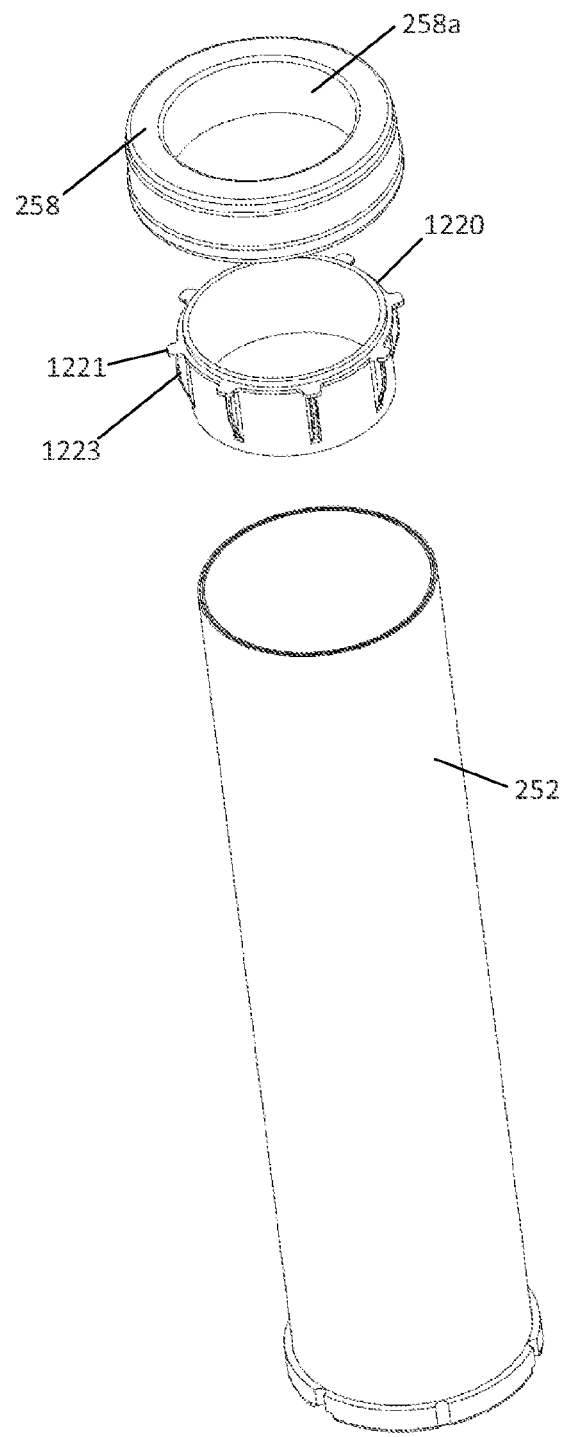
FIG. 10 is an exploded perspective view of a fifth embodiment of a filter assembly.

Referring to FIG. 9 another alternative embodiment is shown wherein the inset collar is entirely defined as being attached to the first portion 258a of the secondary filter element seal structure 258. As shown, inset collar 220" is attached to the first seal structure portion 258a and has a length of $L_5$. Inset collar 220" is configured to mate with a portion of the outlet tube 150" at an interface location 222". The inset collar 220' and the outlet tube 150" can be configured to have teeth, splines or other positive registration means to ensure that they have mated together properly at interface location 222".

Referring to FIGS. 10-14 yet another alternative embodiment is shown wherein the inset collar 1220 is entirely defined as being attached to the first portion 258a of the secondary filter element seal structure 258. In contrast to the aforementioned embodiments, the embodiment of FIGS. 10-14 is especially suitable for retrofit applications where the outlet tube does not extend into the interior volume of the safety filter element, such as the filter assembly 100' shown at FIGS. 18-19. As most easily seen at FIG. 13, inset collar 1220 is attached to the first seal structure portion 258a and has a length of $L_5$ and an internal diameter $D_4$. In the embodiment shown, inset collar 1220 has a length $L_5$ of about 32.5 millimeters (mm) and an average internal diameter $D_4$ of about 66 mm. Due to manufacturing limitations for some materials, especially with plastic molding requiring at least some draft angle, it is sometimes not possible to obtain a perfectly parallel internal wall. As such, the sidewall of the inset collar 1220 may form a generally constant diameter, but have a slight taper.

Additionally, the length $L_5$ of the inset collar 1220, as shown, is greater than the length $L_4$ of the seal structure 258 by about 8 mm. The greater length of $L_5$ is beneficial in accommodating manufacturing variances in the length $L_4$ of the seal structure, nominally shown as being 24 mm, thereby ensuring that the seal structure first portion 258a is entirely covered by the inset collar 1220. As shown, the inset collar 1220 is arranged with respect to the seal structure 258 such that the inset collar 1220 extends past the seal structure first surface 258a in an axial direction towards the closed end cap of the filter, resulting in the formation of an interior volume 260.

This configuration provides significantly enhanced airflow characteristics for a sensor, such as a pressure sensor or a mass air flow sensor, which may be located at port 160', as compared to an application where the seal structure 258 is exposed to the airflow stream. It is also noted that, in contrast to the embodiments of FIGS. 1-9, inset collar 1220 interior surface 1220a is configured to be inset from the interior sidewall 151' of the outlet tube 150' in a manner similar to that shown in FIGS. 18-19. However, the inset collar 1220 may alternatively be configured to mate with a portion of the outlet tube at an interface location in a manner similar to that shown in FIG. 9.

Figure 11:
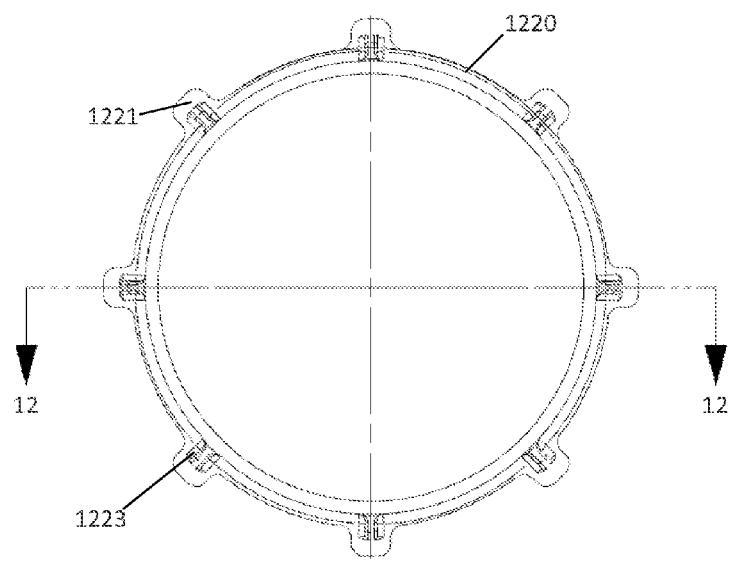
FIG. 11 is a front view of an inset collar usable with the filter assembly shown in FIG. 10.
Figure 12:
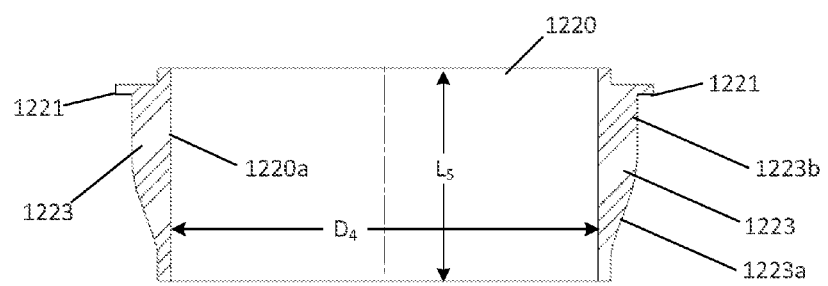
FIG. 12 is a cross-sectional view of the inset collar shown in FIG. 11.
Figure 13:
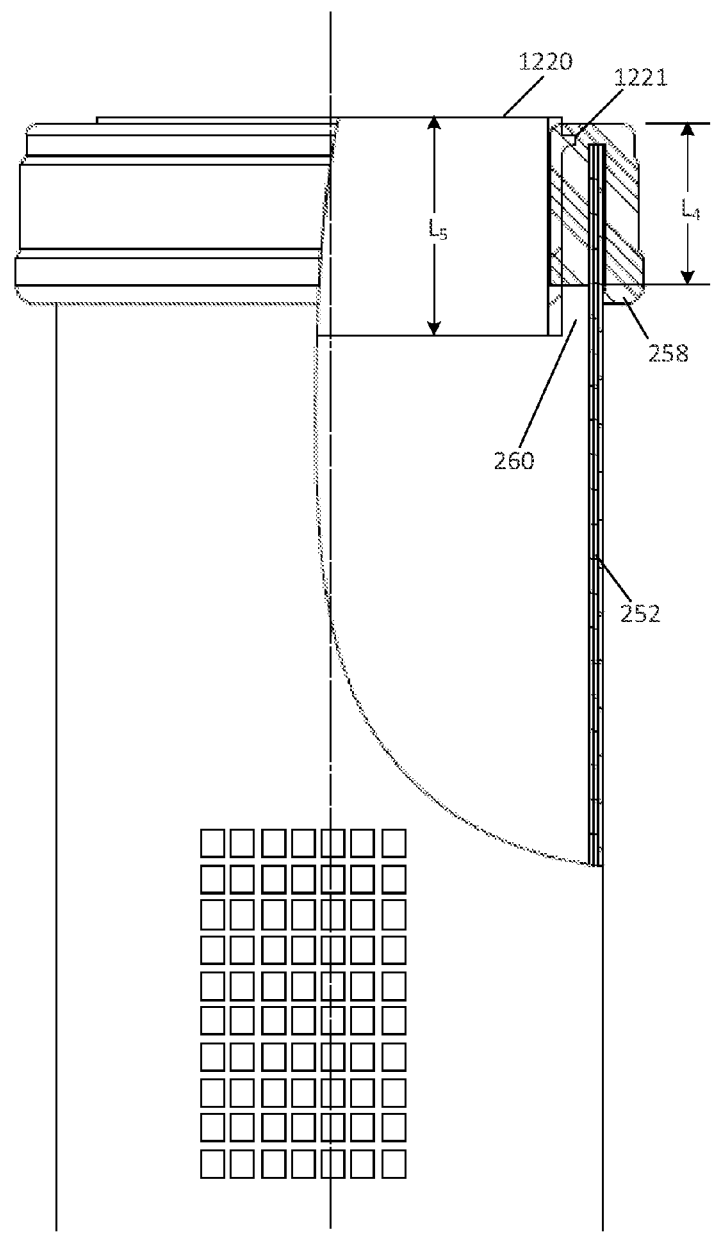
FIG. 13 is a cross-sectional view of a portion of the filter assembly shown in FIG. 10.
Figure 14:
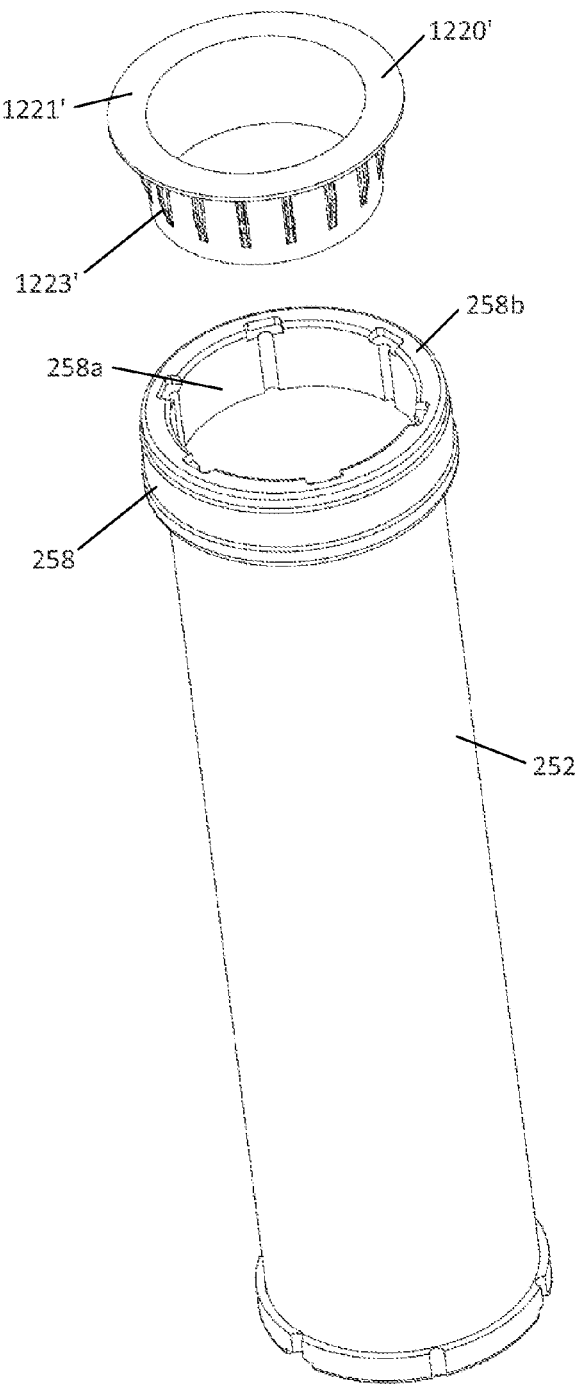
FIG. 14 is an exploded perspective view of a sixth embodiment of a filter assembly.

Referring to FIGS. 11-12, the inset collar 1220 is provided with a plurality of protrusions extending radially outward from the inset collar 1220. In one embodiment, the protrusions are in the form of radially spaced tabs 1221 and ribs 1223. The radially spaced tabs 1221 are configured to engage with the seal structure 258 such that the seal structure 258 may be molded and secured onto the inset collar 1220. FIG. 13 shows one of the tabs 1221 embedded in the seal structure 258. The radially spaced ribs 1223 are provided to ensure proper alignment and spacing between the filter media 252 and the inset collar 1220. Referring to FIG. 12, it can be seen that each rib 1223 has a first portion 1223a that is tapered to allow the filter media 252 to more easily be inserted over the inset collar 1220 and a second portion 1223b that extends to the underside of the tab 1221. As shown, the ribs 1223 extend a distance of about 4 mm from the interior surface 1220a of the inset collar 1220 while the tabs extends about 8.5 mm from the interior surface 1220a.

In the particular embodiment shown, eight tabs 1221 and eight ribs 1223 are provided at an equal spacing about the inset collar 1220. However, fewer or more tabs 1221 and ribs 1223 may be provided depending upon the application. Additionally, although each of the tabs 1221 is shown as being aligned with the one of the ribs 1223, an offset arrangement is also possible. It is also possible to provide an unequal number of tabs 1221 relative to the number ribs 1223. Instead of tabs 1221, the protrusion may be in the form of a continuous or partial ring or other shape projection, preferably with apertures for allowing the sealing structure material to flow through during the molding process.

Referring to FIGS. 15-19 another alternative embodiment is shown wherein the inset collar 1220' is similar to that shown in FIGS. 10-14, but is configured to be removable from the seal structure 258. As most easily seen at FIG. 15, inset collar 1220' can be pressed into and against the first seal structure portion 258a. As shown, inset collar 1220' has a length of $L_5$ and an internal diameter $D_4$. In the embodiment shown, inset collar 1220' has a length $L_5$ of about 33 millimeters (mm) and an average internal diameter $D_4$ of about 66 mm.

Additionally, the length $L_5$ of the inset collar 1220', as shown, is greater than the length $L_4$ of the seal structure 258 by about 8 mm. The greater length of $L_5$ is beneficial in accommodating manufacturing variances in the length $L_4$ of the seal structure, nominally shown as being 24 mm, thereby ensuring that the seal structure first portion 258a is entirely covered by the inset collar 1220'. As shown, the inset collar 1220' is arranged with respect to the seal structure 258 such that the inset collar 1220' extends past the seal structure first surface 258a in an axial direction towards the closed end cap of the filter, resulting in the formation of an interior volume 260.

Figure 18:
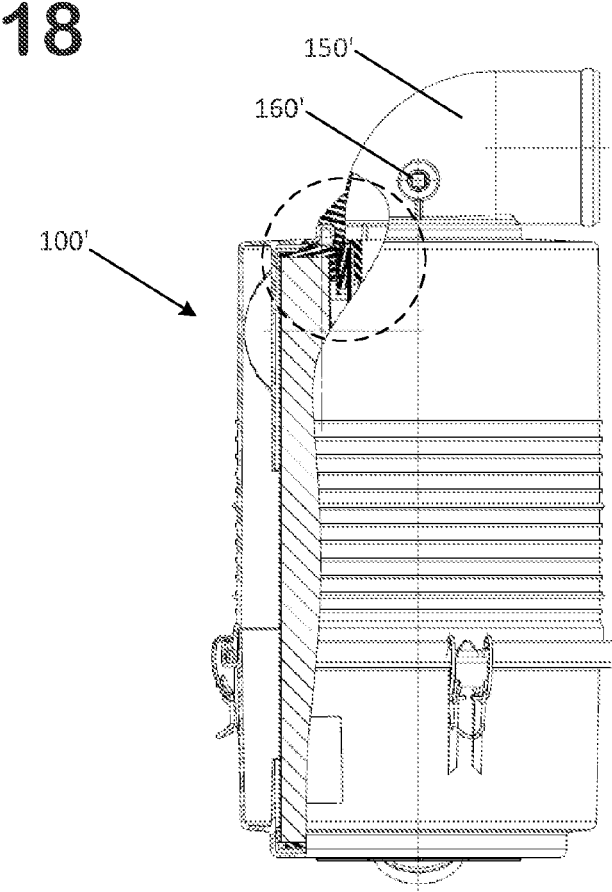
FIG. 18 is a cross-sectional view of the filter assembly shown in FIG. 14 installed in a filter housing.
Figure 19:
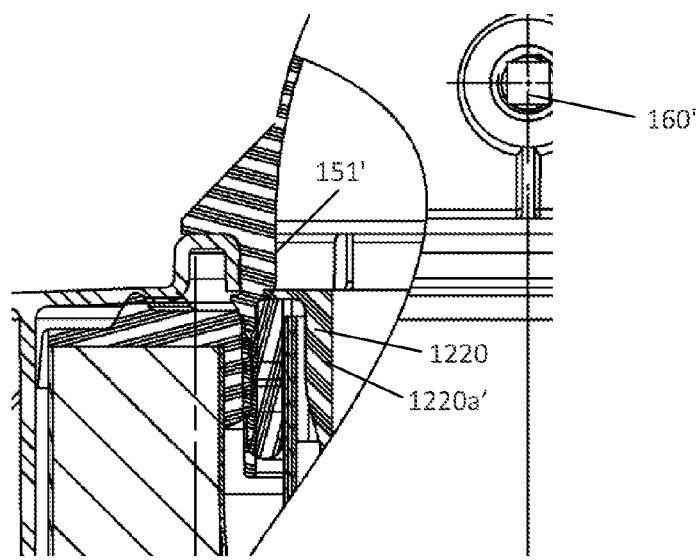
FIG. 19 is an enlarged cross-sectional view of a portion of the filter assembly shown in FIG. 18.

This configuration provides significantly enhanced airflow characteristics for a sensor, such as a pressure sensor or a mass air flow sensor, which may be located at port 160', as compared to an application where the seal structure 258 is exposed to the airflow stream. As can be seen at FIGS. 18-19, the interior wall 1220a' of the inset collar 1220 is configured to be inset from the interior sidewall 151' of the outlet tube 150', but may alternatively be configured to align with a portion of the outlet tube at an interface location in a manner similar to that shown in FIG. 9.

Figure 15:
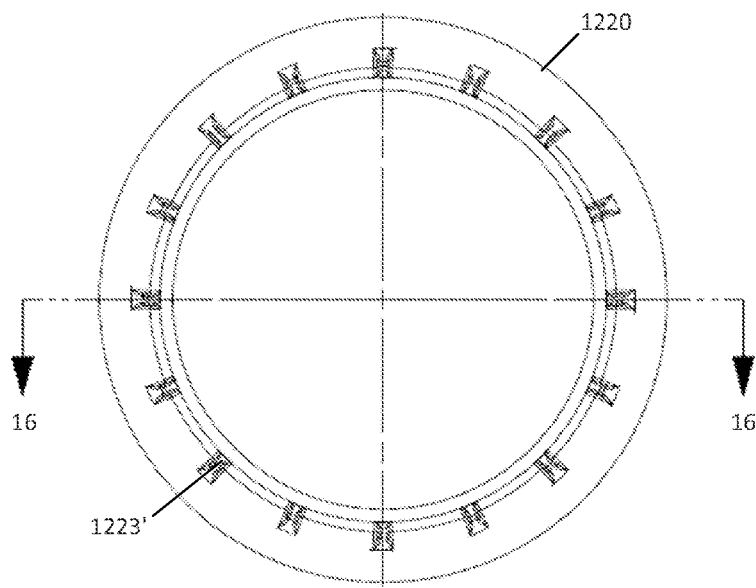
FIG. 15 is a front view of an inset collar usable with the filter assembly shown in FIG. 14.
Figure 16:
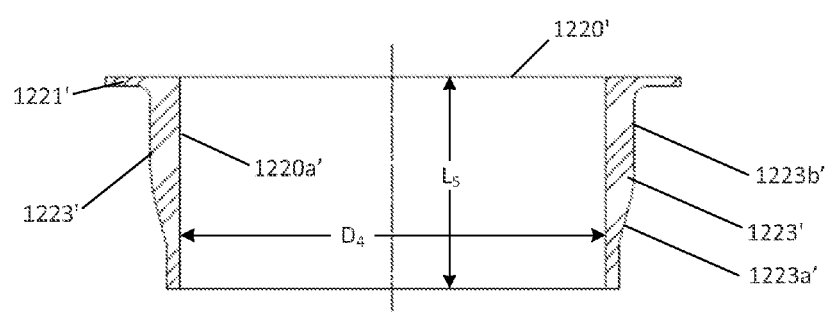
FIG. 16 is a cross-sectional view of the inset collar shown in FIG. 15.
Figure 17:
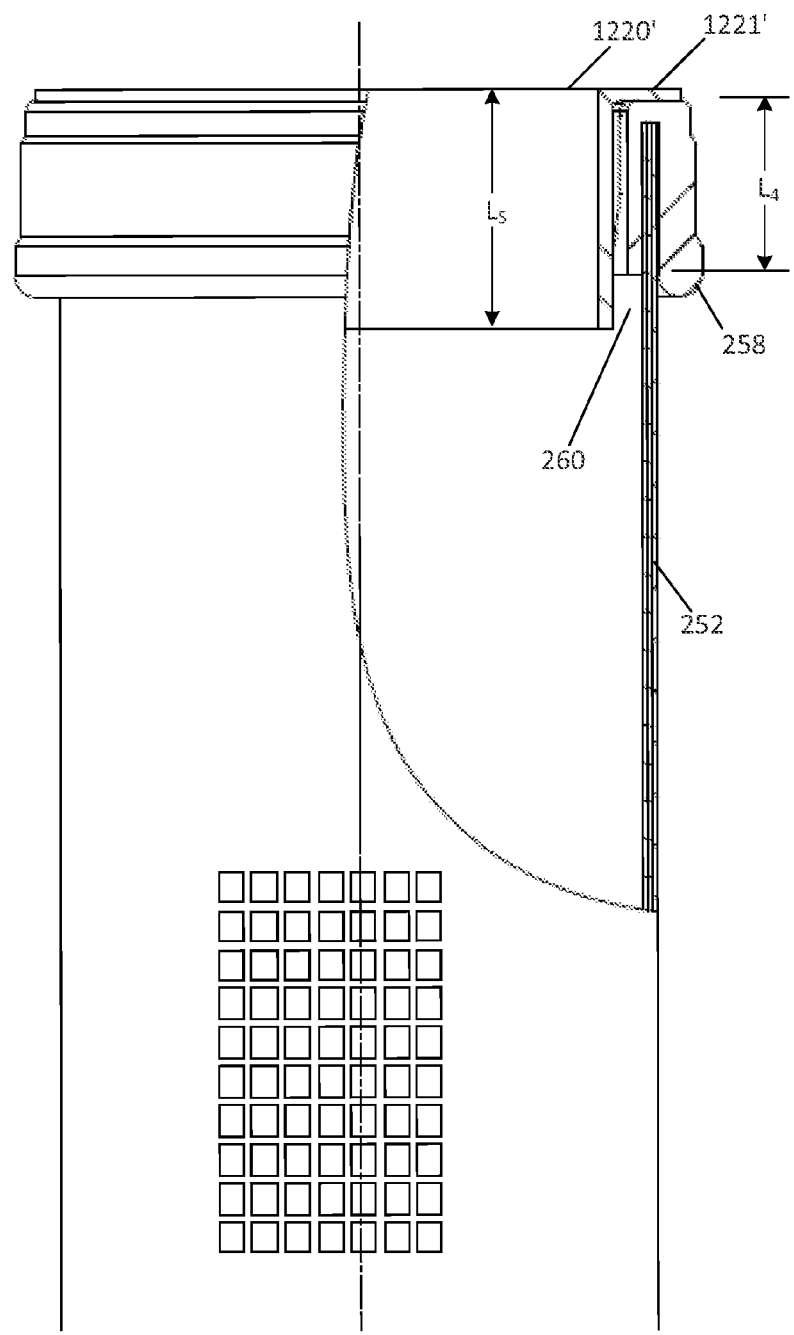
FIG. 17 is a cross-sectional view of a portion of the filter assembly shown in FIG. 14.

Referring to FIGS. 15-16, the inset collar 1220' is provided with a singular flange 1221' and a plurality of radially spaced ribs 1223'. It is noted that a plurality of radially spaced tabs or other such projection(s) can be used instead of the shown flange 1221'. The flange 1221' is configured to engage with the top surface 258b of the seal structure 258 such that the inset collar 1220' may be properly received into the seal structure 258. The radially spaced ribs 1223' are provided to ensure alignment between the inset collar 1220' and the seal structure 258, and to ensure that the inset collar 1220' is frictionally secured to the seal structure 258. Referring to FIG. 16, it can be seen that each rib 1223' has a first portion 1223a' that is tapered to allow the inset collar 1220' to be more easily inserted into the seal structure 258. Each rib 1223' also has a second portion 1223b' that extends to the underside of the flange 1221'. As shown, the ribs extend a distance of about 4.5 mm from the interior surface 1220a' of the inset collar 1220' while the flange extends about 12.5 mm from the interior surface 1220a'.

In the particular embodiment shown, sixteen ribs 1223' are provided at an equal spacing about the inset collar 1220'. However, fewer or ribs 1223' may be provided depending upon the application.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

We claim:

1. A safety filter element comprising:
   (a) a first wall of media extending between a closed end cap and an opposite open end cap, the first wall and end caps defining an interior volume, the open end cap defining a sealing structure having a first portion extending into the interior volume;
   (b) an internal liner adjacent to the first wall of media and within the interior volume defined by the first wall of media; and
   (c) an inset collar secured to the internal liner of the safety filter element at a location between the open and closed end caps and being entirely disposed within the interior volume adjacent to the open end cap.

2. The safety filter element of claim 1, wherein the inset collar includes registration means for positively engaging an outlet tube of an air filter assembly.

3. The safety filter element of claim 1, wherein the inset collar has a length less than a length of the first portion of the sealing structure.

4. The safety filter element of claim 1, wherein the inset collar has a length equal to or greater than a length of the first portion of the sealing structure.

5. The safety filter element of claim 1, wherein the inset collar extends into the interior volume towards the closed end cap further than the first portion of the sealing structure.

6. The safety filter element of claim 1, wherein the inset collar has a generally constant internal diameter.

7. The safety filter element of claim 1, wherein the inset collar is secured to the internal liner of the safety filter element at a location between the open and closed end caps.

8. A filter element comprising:
   (a) a first wall of media extending between a closed end cap and an opposite open end cap, the first wall and end caps defining an interior volume having an inner diameter, the open end cap defining a sealing structure having a first portion extending axially towards the closed end cap into the interior volume a first distance; and
   (b) an inset collar disposed within the open end cap of the filter element and being at least partially disposed within the interior volume such that the inset collar extends axially towards the closed end cap a second distance that is equal to or greater than the first distance, the inset collar being permanently coupled to the open end cap, wherein the inset collar has a maximum outer diameter less than or equal to the inner diameter.

9. The filter element according to claim 8, wherein the sealing structure is molded onto the inset collar.

10. The filter element according to claim 9, wherein the sealing structure is molded onto the first wall of media.

11. The filter element according to claim 8, wherein the inset collar further comprises at least one protrusion extending radially outward from the inset collar, the at least one protrusion being configured to retain the sealing structure onto the inset collar.

12. The filter element according to claim 8, wherein the inset collar further comprises a plurality of alignment ribs radially spaced around the inset collar.

13. The filter element according to claim 8, wherein the inset collar further comprises a flange that engages with a second portion of the sealing structure facing away from the closed end cap.

14. An air filter assembly comprising:
   (a) a housing having an interior volume defined by a sidewall extending between a first end, and a second end, the housing having an air inlet opening in the sidewall and an air outlet opening in the first end;
   (b) a primary filter element operably installed within the housing interior volume, the primary filter element having an interior volume defined by a first wall extending between a closed end cap and an opposite open end cap;
   (c) a secondary filter element operably installed within the primary filter interior volume, the secondary filter element having an interior volume defined by a first wall extending between a closed end cap and an opposite open end cap, the open end cap defining a sealing structure having a first portion extending axially towards the closed end cap into the interior volume a first distance;
   (d) an outlet tube operably connected to the housing air outlet opening; and
   (e) an inset collar disposed within and permanently attached to the open end cap of the secondary filter element and being at least partially disposed within the interior volume of the secondary filter element such that the inset collar extends axially towards the secondary filter element closed end cap a second distance.

15. The air filter assembly according to claim 14, wherein the second distance is equal to or greater than the first distance.

16. The air filter assembly according to claim 14, wherein the inset collar extends entirely over the sealing structure first portion from a first axial end of the first portion to a second axial end of the first portion.

17. The air filter assembly according to claim 14, wherein the inset collar has a generally constant first internal diameter.

18. The air filter assembly according to claim 14, further comprising a port configured to receive a sensing device.

19. The air filter assembly of any of according to claim 14, wherein an interior surface of the inset collar is inset from an interior surface of the outlet tube.

* * * * *